United States Patent [19]
Curl

[11] 3,982,671
[45] Sept. 28, 1976

[54] MULTIPLE FEED POTATO PLANTER

[76] Inventor: Robert B. Curl, 1960 Floral Ave., P.O. Box 562, Twin Falls, Idaho 83301

[22] Filed: Aug. 28, 1975

[21] Appl. No.: 608,559

[52] U.S. Cl. ................................ 222/178; 198/850; 280/6 R
[51] Int. Cl.[2] ........................................ A01C 15/00
[58] Field of Search .................... 222/176, 177, 178; 198/193; 111/77; 172/4; 280/6 R, 6.11

[56] References Cited

UNITED STATES PATENTS

| | | | |
|---|---|---|---|
| 3,036,944 | 5/1962 | White et al. | 198/193 X |
| 3,749,035 | 7/1973 | Cayton et al. | 172/4 X |

*Primary Examiner*—Allen N. Knowles
*Assistant Examiner*—Hadd Lane
*Attorney, Agent, or Firm*—Trask & Britt

[57] ABSTRACT

A potato planter having a plurality of feed tubes attached to at least one central hopper and a plurality of trailing wheels which support the planter during turning is disclosed. The novel planter is further characterized by having a pair of outboard hoppers one each attached to the outer most hopper of the central hoppers (which may be one large hopper with separated bottom bins) and outboard of the main support wheels. The potato planter preferaby has three trailing wheels wherein a pair of adjacent wheels is interconnected hydraulically through hydraulic cylinders to cause said wheels to interact mutually in regard to the terrain. The planter preferably contains an agitator for the main hopper and a secondary feed hopper which has a vibrator attached thereto for feeding potatoes to the main conveyor which transports the potatoes upwardly from the feed hopper and then downwardly to the planting position. The planter further utilizes a small spliced conveyor belt with internal metal inserts to transport potatoes from the main hopper to the smaller feed hopper. An alternative feature of the planter is the utilization of a recessed main bar which supports the forward main support wheels. Also, the trailing wheels are free to rotate, casterfashion, about an axle slightly inclining from the vertical.

7 Claims, 8 Drawing Figures

MULTIPLE FEED POTATO PLANTER

BACKGROUND OF THE INVENTION

1. Field

The instant invention relates to an improved potato planter having a plurality of feed tubes. Such planters are trailed from a tractor or other self-propelled device and contain a large supply of potatoes for planting in furrows which are made by the potato planter.

2. Prior Art

One of the early potato planters is described in U.S. Patent 1,034,017 to Kitchen. It comprises a large hopper with a conveyor mechanism which conveys potatoes to a point near a plow making a furrow so that the potatoes can be dropped in to the furrow.

U.S. Pat. No. 3,132,610 to Hoffman describes a planter having hydraulic lifts attached to a framework to lift the hopper and feed tube portions of the planter so that the feed tubes can be removed from the ground during turning.

A more recent patent, U.S. Pat. No. 3,570,424 to Wigham, describes a potato planter having one or more hoppers attached to a tractor having hydraulic lift means wherein the whole potato planter may be lifted off the ground to facilitate turning of the tractor at row-ends. Because the tractor must lift the whole planter off the ground the Wigham device is only well suited to planters having four or less hoppers.

OBJECTS OF THE INVENTION

It is an object of this invention to provide a potato planter which may be trailed behind a conventional farm tractor and may be easily turned at the ends of fields without lifting the whole planter off the ground.

It is a further object of the instant invention to provide a multiple hopper potato planter wherein additional capacity may be readily added by adding a single hopper to each side of the planter.

A further object of the invention is to provide a potato planter in which the potatoes do not bridge within the main hopper or within the feed hopper.

It is a further object of the invention to provide a multi-feed tube potato planter with trailing wheels which adjust to uneven terrain.

DESCRIPTION OF PREFERRED EMBODIMENT

The instant invention pertains to a potato planter having a plurality of feed tubes wherein one or more central hoppers are supported by a pair of forward wheels outboard of the central hoppers with trailing wheels attached to axles aligned at a slight camber to the vertical wherein an adjacent pair of trailing wheels are preferably interconnected hydraulically to adjust for uneven terrain.

Figure 1:
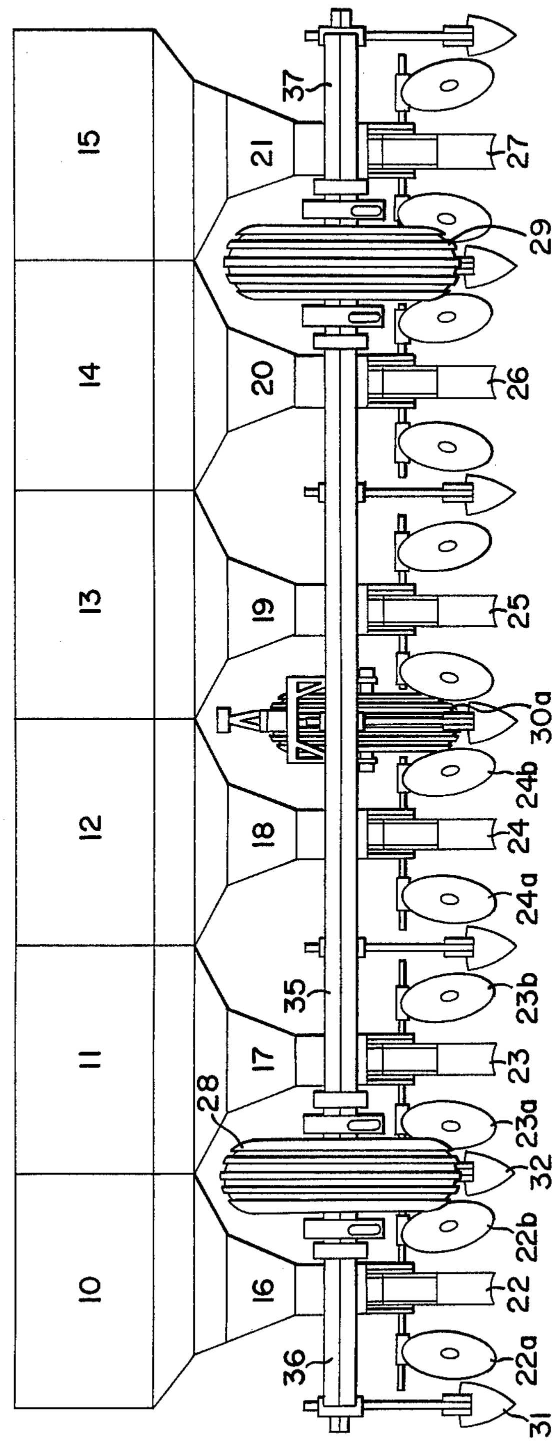
FIG. 1 is an elevational view of the front of a potato planter having four central hoppers and two outboard hoppers.

A typical planter is illustrated in FIG. 1 wherein six hoppers 10 through 15 are each associated with the feed tube 16 through 21 for planting potatoes into furrows dug by plows 22 through 27. The front view illustrated in FIG. 1 shows forward wheels 28 and 29 each located outboard of central hoppers 11 through 14. As indicated elsewhere herein, the central hoppers may comprise one large hopper without any separator, except the provision of separate bottom bins associated with feed tubes 16 through 21. The middle trailing wheel 30a is viewable between feed tubes 18 and 19.

Disks 22*a* and 22*b* cover the planted furrow made by plow 22. Each seed plow has a pair of associated disks, one on either side of the plow and to the rear of the plow, which cover the seed potatoes lying in the furrow made by the feed plow. Also located on each side of a feed plow are a pair of covering plows, for example feed plow 22 has associated therewith covering plows 31 and 32 which further assist in covering the planted furrow. Covering plows 31 and 32 are generally located outboard of disks 22*a* and 22*b*.

A main transfer support bar 35 supports the central hoppers 11 through 14 and is recessed behind forward wheels 28 and 29 to then connect with support bar extensions 36 and 37 to support the extension hoppers 10 and 15.

A typical construction of potato planters is to provide one feed hopper for each feed tube. For large operations, a minimum of four feed hoppers per planter is preferred. Generally, a planter having four large feed hoppers cannot be lifted entirely off the ground by the hydraulic system of a tractor because the planter weight exceeds the power of the hydraulic system and also tips the front of the tractor off the ground. The system illustrated in U.S. Pat. No. 3,282,207 whereby the entire planter is lifted off the ground is applicable to planters having four, or less, hoppers which are of a small size. The device illustrated in FIG. 1 and described in this invention have a minimum of four large hoppers and cannot generally be lifted entirely off the ground by a hydraulic system of a tractor. The planters of this invention are not intended to be lifted off the ground by the tractor but merely tilted to the rear with a substantial portion of the weight resting on the trailing crazy wheels. The planter of the instant invention preferably have four or six large hoppers. The hoppers may be interconnected at the top, i.e., without partitions between the upper portions of the hoppers, in effect, to form one large bin, but the hoppers are distinct at the bottom and of sufficient size to provide an adequate supply of potatoes for four or six feed tubes.

Planters having an excess of six hoppers are preferably articulated to compensate for uneven terrain so that a substantially uniform planting depth is maintained. Articulated planters are more expensive to manufacture and to maintain.

It is an advantage of the planters of the instant invention that a substantially uniform planting depth can be obtained with either a four-hopper planter, that is four feed tubes, or a six-hopper planter inasmuch as the forward support wheels of the six-hopper planter are the same distance apart as for the four-hopper planter.

The feed hoppers commonly utilized in the four and six row hoppers in the instant invention have a seed capacity of about 1,200 pounds each. Thus, a four-hopper planter has a total seed capacity of 4,800 pounds and a six-hopper planter has a total seed capacity of 7,200 pounds.

A commercial four-hopper potato planter of the type illustrated in U.S. Pat. No. Re. 28,207 has a total hopper capacity of about 2,800 pounds as compared with the total hopper capacity of 4,800 pounds for commercial planters of the type illustrated herein. The weight of a commercial four-hopper planter of the type illustrated in U.S. Pat. No. Re. 28,207 is about 2,600 pounds, thus the total loaded weight of such a planter is about 5,400 pounds. A weight greater than this is too great for lifting of the whole planter by the hydraulic system of the tractor without adding extra weight to the front of the tractor, and, often requiring a hydraulic system lift of heavier duty than is conventional. Although the four-hopper planters of the instant invention have a greater total weight loaded, for example, a total weight which may approach 8,000 pounds, the weight lifted by the hydraulic system of the tractor can generally be less than about 5,000 pounds because of the leverage affect and the maintaining of substantial portion of the weight of the planter on the trailing crazy wheels.

Figure 2:
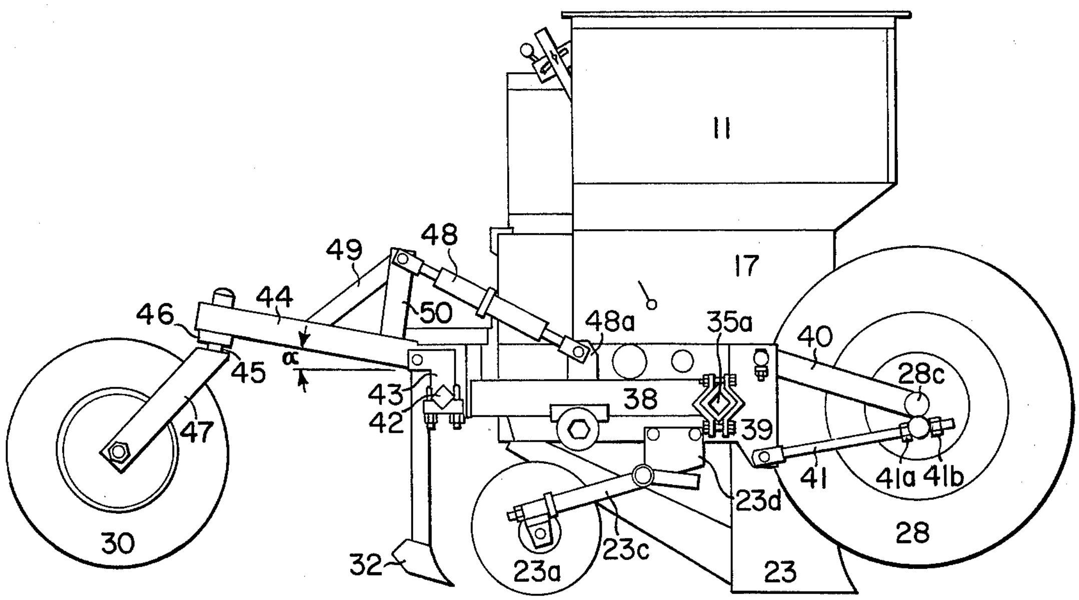
FIG. 2 is an elevational view of the side of a potato planter having four central hoppers.

A four-row planter similar in construction to the six-row planter illustrated in FIG. 1 is illustrated in a side elevational view in FIG. 2. Feed hopper 11 is supported by support frame 38 attached to recessed support bar **35*a*. A hinge block 39 also attached to support bar 35*a* supports wheel strut 40 and depth adjustment bar 41. Wheel strut 40 attaches to the axle 28*c* about which wheel 28 rotates. Strut 40 is hinged in block 39 so that adjustment of the adjustment nuts 41a and 41b will cause strut 40 to raise or lower since the forward portion of the adjustment bar is attached to the forward portion of strut 40. Thus, the position of wheel 28 may be raised or lowered in relation to the feed tube 17 and plow 23, thus providing adjustment for the depth of furrows made by plow 23. A forward locating position of wheel 28, that is, the recessing of support bar 35*a* permits the ground contact point of wheel 28 to be very close to plow point 23, thus providing the maximum depth adjustment for plow point 23 through adjustment of the vertical location of wheel 28. A tool bar 42 is connected at the rear of hopper support bar 38. The tool bar 42 runs transversely across a rear portion of the planter and is utilized to support the covering of plow 32 or other tool attachments. Disk 23*a* is supported by disk strut 23*c* which attaches to disk strut support 23d which attaches to the base of hopper 11. A support angle 43 is also pivotally attached to tool bar 42. Also attached to the tool bar is crazy wheel arm 44 which inclines slightly from the horizontal and has axle means 45 passing through a bearing support 46 on arm 44. Crazy wheel strut 47 is attached to axle means 45 so that the crazy wheel can turn caster fashion and thus permit the easy turning of the planter at the end of a field by slighly elevating the front wheels off the ground and then pivoting the device around by turning the tractor and allowing the crazy wheels to follow around in a caster-like fashion. The vertical position of the crazy wheel 30 is adjustable by leveling jack 48 which attaches to lug 48*a* to support 38 and through jack arms 49 and 50 to the crazy wheel arm 44**. The function and operation of the three trailing crazy wheels is more readily illustrated in FIG. 3.

Figure 3:
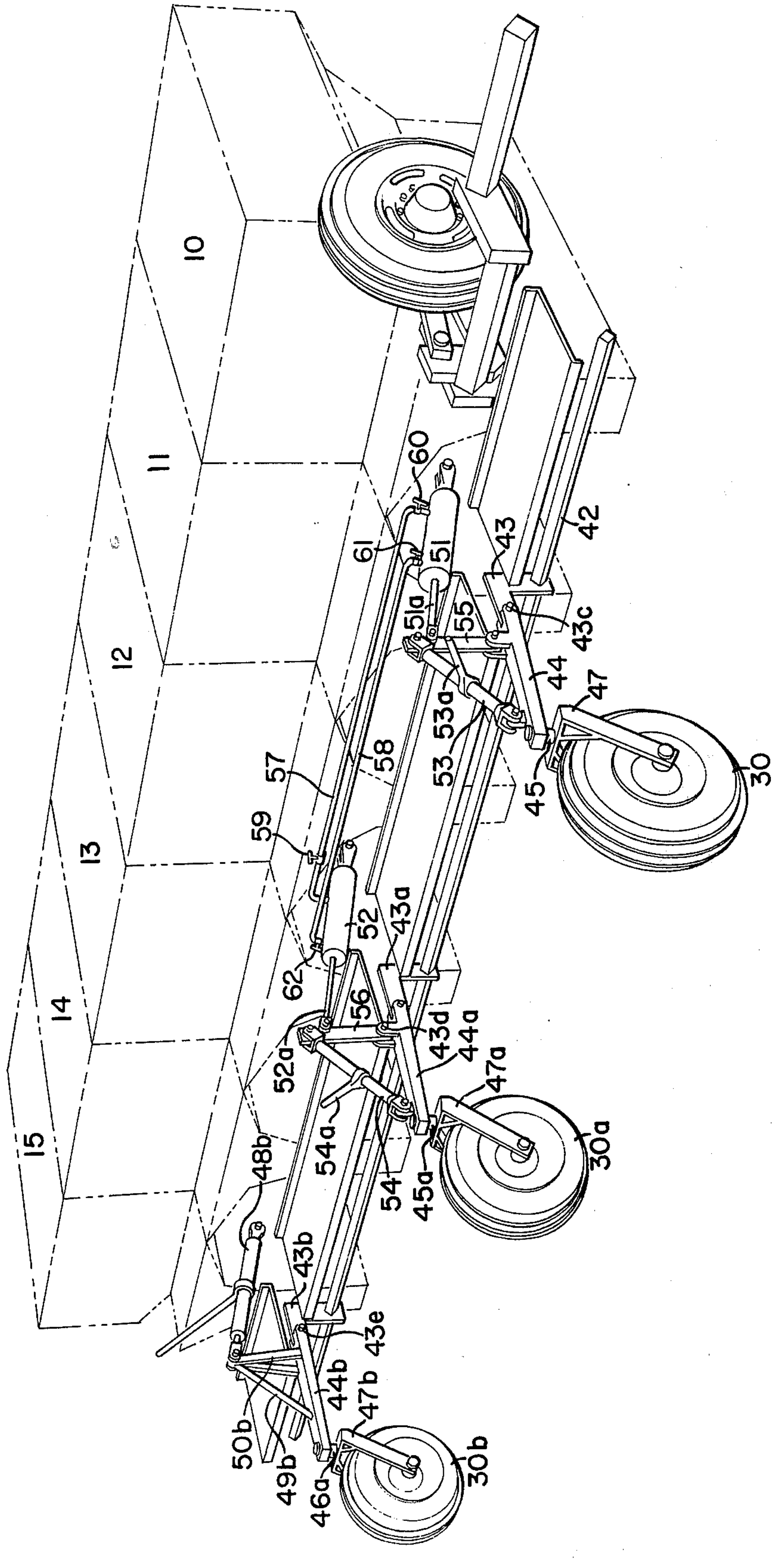
FIG. 3 is a perspective view of the rear of a potato planter having four central hoppers.

The caster-like placement of crazy wheels 30, **30*a* and 30*b* is illustrated in FIGS. 2 and 3. Wheels 30 and 30*b* are equidistantly spaced from wheel 30*a*. Wheels 30 and 30*b* are generally longitudinally aligned with the two forward wheels 28 and 29 of the planter. Crazy wheel arm 44 inclines slightly from the horizontal so that axle 45 is inclined slightly from the vertical so that the axle of each crazy wheel is preferably slightly behind the upper axle. The angle alpha, which is the angle of inclination of arm 44** from the horizontal is preferably maintained at about 2° to about 10°. The angle may be adjusted by adjustment of the leveling jack associated with the particular arm. The planter illustrated in FIG. 2 has two crazy wheels, each associated with a leveling jack. The planter of FIG. 2 does not have any of the crazy wheel supports interconnected hydraulically.

The planter illustrated in FIG. 3 is similar in most respects to the planter illustrated in FIGS. 1 and 2 except that two of the crazy wheels are interconnected hydraulically to adjust to the terrain. Crazy wheel 30 is supported by fork 47 and attaches through an axle 45 to crazy wheel arm 44. A leveling jack 53 is connected to a movable jack arm 55 to interact through hydraulic cylinder 51 to adjust the angle of inclination of crazy wheel arm 44 to the horizontal. Arm 44 and all the structures attached to it are hinged about pin 43c which also passes through support angle 43. Hydraulic cylinder 51 is attached through hydraulic lines 57 and 58 to hydraulic cylinder 52. The hydraulic cylinders interconnect mechanically with arms 55 and 56, respectively, through piston rods **51*a* and 52*a*. Line 57 connects to the bottom of each of the cylinders while line 58 attaches to the top of each of the cylinders. The cylinders and lines are completely filled with hydraulic fluid and in a normal or level condition the piston of each cylinders is located midway in the cylinder. The objective of the interconnected hydraulic system is to maintain the planter in a condition as close to level as possible and to maintain the depth of the planting plow uniform. In operation on any irregular terrain or surface which causes wheel 30*a* to elevate, fluid from the bottom of cylinder 52 is forced through line 57 into the bottom of cylinder 51 thus forcing piston rod 51a towards leveling jack 53 and pivoting the whole structure about pin 43*c* to lower wheel 30 the same amount that wheel 30*a* was elevated. Valves 59 and 60 in line 57 are utilized to isolate one cylinder from the other. Valves 61 and 62 have the same function in line 68**. By the closing of all these valves the flow of hydraulic fluid from one cylinder to the other is prevented, thus permitting the operation of the planter without the leveling adjusting function.

In a preferred embodiment, the hydraulic system between adjacent crazy wheels comprised only a single line, e.g., line 57 connecting the cavities of the lower portion of each cylinder with the upper portion of the cylinder being open to the atmosphere.

Figure 4:
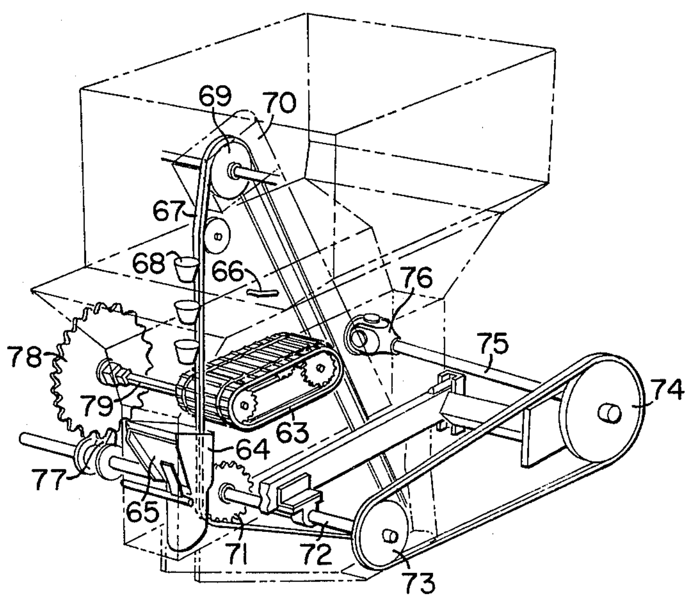
FIG. 4 is a perspective view of a hopper with a cut-away section illustrating the internal conveyor belt and feed hopper vibrator.

FIG. 4 is a perspective view of a cut-away section of the planter showing the feeder belt 63, which is a continuous conveyor belt, which conveys seed potatoes from the main hopper to the feed hopper 64. Feed hopper 64 has an end wall 65 which vibrates to prevent the feed from bridging within the hopper. Feed hopper 64 is further illustrated in FIG. 6. An agitator 66 is present in the main hopper as well to prevent the bridging of feed therein. The main hopper agitator is further illustrated in FIG. 8.

FIG. 4 further illustrates the main conveyor 67 which carries cups 68 upward through the feed hopper 64 and then over an upper pulley 69 at which point seed potatoes are dropped from the bowl portion of a cup onto the bottom of the next adjacent cup to pass down through a protective chute 70 to be discharged near a boot which open a furrow to receive seed. The main conveyor 67 is propelled by sprocket 71 which is driven by shaft 72. Shaft 72 is turned by pulleys 73 and 74 which are interconnected by a belt or chain. The pulley 74 is rotated through shaft 75 by means of a U-joint 76 which is fastened to one of the forward wheels 28 or 29. Conveyor 63 and agitator 66, as well as agitator 65, are also actuated by shaft 72. Gear 77 on shaft 72 turns another gear 78 which is attached to the shaft 79 which turns a pulley or wheel about which conveyor 63 moves. Agitator 65 is actuated by a cam attached to shaft 72 while agitator 66 is driven by means connecting at the shaft 72.

The cups illustrated in FIG. 4 may be of conventional design and manufacture, i.e., a cast aluminum cup of conical shape with a large upper opening to accommodate the potato seed and a smaller bottom opening for discharge of dirt. Preferably, however, the cup is coated with a smooth, dirt resistant coating of a suitable thermoset or thermoplastic resin.

The conventional cast aluminum cuts are advantageous in that they are light and easy to manufacture. However, the cast surface is rough, packed and pitted, which tends to gather soil, particularly in machines of the instant invention which have the lower part of the conveyor close to the furrow. It frequently occurs that the cup becomes clogged with dirt and will not pick up a seed as it passes through the feed hopper. This results in skipped plantings, or misses, thereby decreasing the yield of a particular field.

It was found that cups with an interior smooth, machined surface were less inclined to pick up dirt and become clogged. Machining of individual cups is expensive, however, and difficult to perform on the interior conical surface. On the unmachined, cast aluminum surface dirt becomes so packed that it is necessary to stop the machine and rod out the clogged cups. It has been discovered that coating the cup interior with a smooth resinous coating of a hard plastic material provides a cup which does not readily clog and which can be easily unclogged as dirt does accumulate.

Typical plastic materials for this purpose include thermosetting plastics such as unsaturated polyesters, epoxies, polyurethanes and the like and high temperature, waxy thermoplastic materials such as nylons and tetrafluoroethylene coatings. The thermosetting materials are generally preferred inasmuch as the coating to a necessary thickness to cover pits and bumps can be readily applied by dip casting; i.e., dipping the cup into the liquid thermosetting material, then removing the cup and allowing the coating to cure. Curing may be facilitated by heating.

Plastic cups, even of reinforced material, tend to craze and crack with prolonged use. The plastic coated aluminum cups provide improved planting efficiency, fewer stoppages to unclog cups and a curable, rugged cup.

Figure 5:
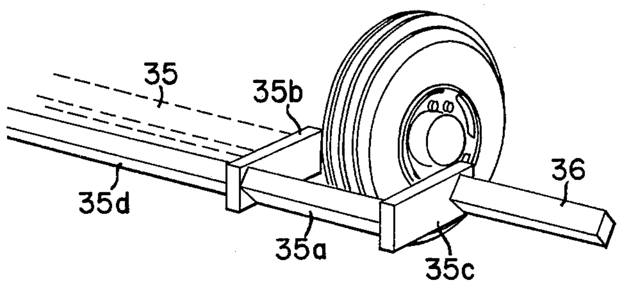
FIG. 5 is a perspective view with a cut-away showing non-Z bar support at the front of the potato planter.

FIG. 5 illustrates an improved version of a main support bar wherein the dotted line illustrates the transverse support bar 35 and the support block 35*b* interconnected to bar 35 and recessed bar 35*a*. Longitudinal block 35*c* interconnects recessed bar 35*a* with bar extension 36. In an improved version, bar 35*d* is an extension of bar 35*a* and passes through a portion of the hoppers. Block 35*b* may be eliminated by this improved construction. The construction of 35*d* as an extension of 35*a* permits the use of a solid bar, without recesses, to extend the whole width of the central hoppers. Bar 35*d* is exposed between hoppers to that it still provides means for attaching a tractor to the planting device.

Figure 6:
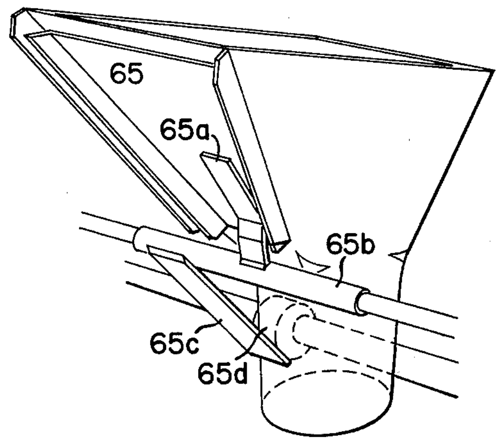
FIG. 6 is a perspective view of the feed hopper vibrator.

FIG. 6 is a perspective view of the feed hopper vibrator wherein triangular member 65 is a rear wall portion of the hopper and is interconnected to vibrator support 65*a* and to vibrator axle 65*b* which is connected to the vibrator cam follower 65*c*. Cam follower 65*c* comes in contact with the rotating cam 65*d* having a projection thereon which moves cam follower 65*c* once each revolution of the cam.

Figure 7:
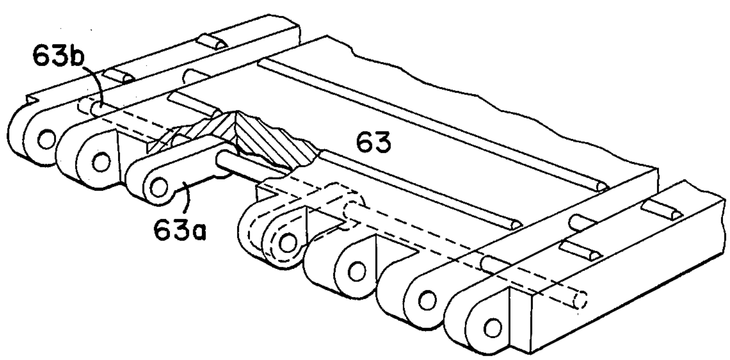
FIG. 7 is a perspective view of the conveyor belt with steel clip reinforcements.

FIG. 7 is a perspective view of the steel clip reinforced conveyor belt 63 illustrating the continuous steel clip loop 63*a* which loops around the steel support bar 63*b* at the rear and has an opening in the forward section thereof to receive a connecting bar to make a continuous loop belt. Repair and replacement of parts in the field is frequently encountered in any farm machinery. A continuous belt which cannot be disassembled presents difficult and time consuming repair problems. The belt illustrated in FIG. 7 is particularly adapted for installation in the field inasmuch as a single length of belt can be looped around the conveyor wheels and then joined by passing a steel rod through the openings in the belt.

Figure 8:
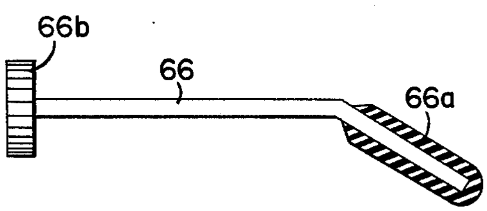
FIG. 8 is an elevational view of the main hopper mixer arm.

FIG. 8 is an elevational view of the hopper mixer arm which is further illustrated in FIG. 4. The mixer arm 66 has an inclined head portion 66*a* and is connected at a base to a sprocket 66*b*. The sprocket interconnected by chain means to a main drive sprocket which drives the potato seed conveyor and the conveyor belt 63 and the feed hooper vibrator cam. The rotation of mixer arm 66 prevents potatoes from bridging in the main section of the supply hopper.

I claim:

1. A potato planter having a plurality of feed tubes each associated with a plurality of hoppers, comprising:

a. at least a pair of central feed tubes associated with at least one central hopper having a transverse bar attached thereto and tractor attachment means supported by said transverse bar, each said feed tube having associated therewith a conveyor chain to convey potato seed from a main feed hopper to a discharge end of said feed tube;

b. a pair of forward support wheels in close alignment with the lower extremities of said feed tube immediately outboard of said central hopper and near the front of said hopper;

c. at least one pair of trailing wheels located to the rear of said hoppers and secured to support means above said trailing wheels to permit travel in any direction;

d. a pair of outboard hoppers, one each attached to the outermost hoppers of the central hoppers and outboard of said forward support wheels, and e. attachment means adapted to attach to the hydraulic lift mechanism of a tractor to lift said forward support wheels off the ground.

2. The planter of claim 1 wherein three trailing wheels are present, two of the adjacent wheels connected hydraulically.

3. The potato planter of claim 1 wherein four central feed tubes coact respectively with four central feed hoppers.

4. The potato planter of claim 1 having three trailing wheels, the outer two of which are in substantial alignment with said forward support wheels.

5. The potato planter of claim 1 wherein a small feed hopper with a vibrated wall is associated with each feed tube and communicates with a main potato hopper.

6. The potato planter of claim 1 wherein each main hopper has a rotated elongated agitator to prevent bridging in said main hopper.

7. A potato planter having at least four side-by-side hoppers in fixed relation, each hopper having a feed tube associated therewith comprising:

a. a pair of forward support wheels in proximity to the lower extremities of a pair of said feed tubes;

b. three trailing support wheels each freely rotatable about an upwardly inclined axle, said wheels spaced substantially equidistantly across the width of said potato planter, one of said outermost trailing wheels vertically adjustably fixed, two adjacent trailing wheels vertically adjustably fixed and interconnected with balancing means interconnecting said adjacent wheels to counterbalance the elevation of one wheel with the other.

* * * * *